United States Patent [19]

Hafner et al.

[11] 3,880,638

[45] Apr. 29, 1975

[54] THERMAL TEMPERING OF NON-OXIDE GLASS COMPOSITIONS

[75] Inventors: Harold C. Hafner, Richardson; Andre E. Tilton, Garland, both of Tex.

[73] Assignee: The United States of America as represented by the Secretary of the Air Force, Washington, D.C.

[22] Filed: Dec. 21, 1973

[21] Appl. No.: 427,285

[52] U.S. Cl. ............... 65/116; 65/114; 264/1; 423/508
[51] Int. Cl............................................. C03b 27/00
[58] Field of Search .............. 65/116, 114; 264/1; 423/508

[56] References Cited
UNITED STATES PATENTS

| 2,026,165 | 12/1935 | Goodwillie | 65/114 |
| 3,679,388 | 7/1972 | Giddins et al. | 65/116 |

Primary Examiner—Arthur D. Kellogg
Attorney, Agent, or Firm—William O'Brien

[57] ABSTRACT

A method for thermally tempering non-oxide ternary glass compositions in which the glass is first preheated to a point above its annealing temperature, then tempered at temperatures of from about 450° to 500°C, followed by quenching in an elevated temperature oil bath which is subsequently cooled to room temperature.

3 Claims, No Drawings

THERMAL TEMPERING OF NON-OXIDE GLASS COMPOSITIONS

BACKGROUND OF THE INVENTION

This invention relates to a method of tempering glass compositions. More particularly, this invention concerns itself with a method for strengthening non-oxide glasses composed of ternary compositions of germanium, selenium and a third element selected from the group consisting of antimony, arsenic, iodine, gallium, mercury and tellerium.

Recent advances in infrared technology has generated considerable interest in the development of reconnaissance and detection systems which utilize this medium. The use of these systems for airborne applications is of special importance because of the obvious tactical advantages arising from their use with high speed and high altitude aircraft. However, airborne infrared systems operating in the $8\mu$ to $14\mu$ wavelength region require optical materials for windows and lenses that are homogeneous, able to withstand atmospheric exposure, and able to withstand temperatures up to 300°C. A number of glasses with these desired properties were developed and a capability to manufacture blank sizes up to 5 by 7 by ½ inch was achieved. These glasses are non-oxide, ternary compositions composed of germanium, selenium and a third element selected from the group consisting of antimony, arsenic, iodine, gallium, mercury and tellurium.

Glasses are ideal optical materials because they can be produced in high homogeneity, are easy to fabricate, are capable of withstanding adverse environmental conditions, and are usually not size limited. Their breaking strength, however, is much lower than one would predict from the chemical binding forces between the constituent atoms. It is well known that glasses, like other brittle materials, break when their surfaces are placed under tensile stress. Extremely small surface flaws in glass act as stress concentrators and cause premature breakage. Glasses can be treated to reduce the effect of surface flaws and thus increase their breaking strength. Aircraft windows must withstand stresses induced by mechanical forces as well as those introduced by thermal gradients. Considerable effort, therefore, has been expended in attempting to find glass compositions that possess the strength necessary for their use in infrared airborne applications.

The non-oxide glasses referred to above transmit in the infrared region of the electromagnetic spectrum, but do not possess the requisite strength needed to overcome the stress and strain encountered by high speed and high altitude aircraft. These glasses have an average breaking strength of 2500 psi which compares to 10,000 psi for a commercial plate glass. Attempts at increasing their operational or useful strength by resorting to known strengthening method, such as thermal tempering, has not proved fruitful.

Glasses are inherently weak even through their theoretical breaking strength approaches their Young's Modulus which is over $1 \times 10^6$ psi. The inherent weakness is due to structural and/or surface flaws which act as stress concentrators so when a tensile stress is applied to the external surface premature failure occurs. Measured breaking strengths are less than 1/100 of the theoretical value. As is well known, the effect of the surface flaws can be minimized by heat-treating the glass to introduce a permanent compressive stress in the surface. This is accomplished commercially by a thermal tempering process which, for commercial oxide glasses, is essentially a two step operation. The glass, held by one edge, is transferred from room temperature into a suitable furnace operating at 750°C which is near the softening temperature of the glass. The glass remains in this furnace until its surface temperature reaches 650°C–700°C. It is then quickly removed and cooled rapidly (quenched) to room temperature by a controlled air blast on both sides of the glass. The glass prior to quenching is in a plastic condition. When it is quenched, the exterior layers quickly become rigid while the interior is still plastic and expanded. As cooling continues, the interior tries to contract but is restrained by the rigid exterior envelop, thereby placing a compressive stress in the surface which remains when room temperature equilibrium is reached. The non-oxide glasses of this invention can be thermally tempered. However, their characteristic low thermal conductivity and high expansivity make them thermal shock sensitive and breakage occurs if one uses the conventional processing techniques described for commercial plate glass.

With this invention, however, it has been found that a particular type of thermal tempering process will provide the requisite strength needed to utilize the non-oxide glasses contemplated by this invention for airborne infrared applications. The novel strengthening process of this invention involves the steps of preheating the glass composition prior to tempering. In general, the glass is placed in a suitable aluminum holder having an aluminum plate thickness of ½ inch. Grafoil, a graphite foil, was placed between the aluminum and the glass to prevent breakage from clamping pressure and from sticking to the aluminum. Grafoil is a Trademark of Union Carbide Corporation. The glass in the holder is then placed in a preheat furnace at room temperature. The temperature is then raised to 40°–50°C above the annealing temperature of the glass and held at that temperature for 1 hour. The glass in the holder is then transferred quickly to a tempering furnace operating at a temperature of from 400°C to 500°C. The aluminum holder protects the glass from thermal shock during transfer from the preheat furnace to the tempering furnace. Any high thermal conductivity material such as copper or graphite and even mild steel may be used in lieu of the aluminum. It remains in this furnace until its surface reaches a temperature that produces a viscosity of between $10^8$ to $10^9$ poise. The glass is then quickly transferred to an oil bath and quenched at an elevated temperature for several minutes. The heat source for the oil bath is allowed to cool to room temperature in about 16 hours. The oil temperature determines the quenching rate. Quenching temperatures of from about 105° to 190°C have been found useful.

The glass is now tempered and after a conventional polishing operation, is ready for use as a window material for infrared applications.

SUMMARY OF THE INVENTION

In accordance with this invention, the strengthening of non-oxide glasses of the type contemplated by this invention can be accomplished by a novel thermal tempering process which involves an initial preheating step prior to tempering the glass at tempering temperatures.

Commercial plate glass and other oxide glasses are tempered by placing a piece of the glass at room temperature into a tempering furnace, which has a uniform temperature slightly above the softening point of the glass. It is held in the tempering furnace for several minutes (usually 4 minutes to 10 minutes), removed and cooled quickly (quenched) to room temperature by blowing air uniformly on both sides of the piece. A quantity of air impinging on the glass determines the quenching rate.

The non-oxide glasses of this invention cannot be placed directly into a tempering furnace from room temperature because breakage from thermal shock occurs. Even though their surfaces are under compressive stress during heating, temperature gradients along the surface during transfer could cause breakage. Instead, they are preheated above their strain point (about 240°C to 350°C) before transfer to the tempering furnace. The glass must be placed in the preheat furnace when both are at room temperature. The heating rate to the strain point was about 40°C per hour for samples up to ½ inch thick. The tempering furnace temperature is above the softening point of the glass being tempered. It is held there for several minutes and quenched in oil at an elevated temperature. The oil temperature determines the quenching rate.

After tempering, the surface of the glass composition may be polished to a desired finish using a conventional polishing operation. The process of the invention provides infrared transmitting glasses that are characterized by having the necessary strength needed to overcome the high stress and strain conditions encountered during airborne operations.

Accordingly, the primary object of this invention is to provide non-oxide glasses characterized by a high degree of breaking strength.

Another object of this invention is to provide a method for increasing the operational or useful strength of non-oxide, ternary glass compositions.

Still another object of this invention is to provide a novel thermal tempering process for non-oxide glasses that provides for a significant improvement in the breaking strength of such glasses.

The above and still other objects and advantages of the present invention will become readily apparent upon consideration of the following detailed description thereof.

DESCRIPTION OF THE PREFERRED EMBODIMENT

The present invention is predicated upon the discovery that non-oxide glasses of the type contemplated by this invention can be significantly strengthened by a novel thermal tempering process which includes a preheat treatment of the glass prior to tempering.

The non-oxide glass compositions of this invention are especially useful because of their ability to transmit infrared radiations in the $8\mu$ to $14\mu$ wavelength region. These glasses are homogeneous, able to withstand atmospheric exposure and temperatures up to 300°C. They are especially valuable as optical materials for windows and lens used in various airborne applications. However, these materials have an average breaking strength of 2500 psi which compares to 10,000 psi for a commercial plate glass.

Glasses are inherently weak even though their theoretical breaking strength approaches their Young's Modulus which is over $1 \times 10^6$ psi. The inherent weakness is due to structural and/or surface flaws which act as stress concentrators so when a tensile stress is applied to the external surface premature failure occurs. Measured breaking strengths are less than 1/100 of the theoretical value.

The effect of the surface flaws can be minimized by heattreating the glass to introduce a permanent compressive stress in the surface and this is accomplished commercially by a thermal tempering process which, for commercial oxide glasses, is essentially a two step operation. The glass, held by one edge, is transferred from room temperature into a suitable furnace operating at 750°C which is near the softening temperature of the glass. The glass remains in this furnace until its surface temperature reaches 650°C–700°C. It is then quickly removed and cooled rapidly (quenched) to room temperature by a controlled air blast on both sides of the glass. The glass prior to quenching is in a plastic condition. When it is quenched, the exterior layers quickly become rigid while the interior is still plastic and expanded. As cooling continues, the interior tries to contract but is restrained by the rigid exterior envelop, thereby placing a compressive stress in the surface which remains when room temperature equilibrium is reached. The glasses of this invention can be thermally tempered. However, their characteristic low thermal conductivity and high expansivity make them thermal shock sensitive and breakage occurs if one uses the conventional processing techniques described for commercial plate glass.

The present invention, however, overcomes this problem by providing a novel thermal tempering process that achieves a significant improvement in the operational strength of the non-oxide, ternary glass compositions of this invention.

In carrying out the invention, the glass to be tempered is placed in an aluminum holder suitably designed to hold a glass sample. An aluminum plate thickness of ½ inch was found to be satisfactory. The glass in the holder is placed in a pre-heat furnace at room temperature. Temperature was then raised to 40°–50°C above the annealing temperature of the glass and held for 1 hour. In general, the pre-heat furnace is heated to a temperature of from about 300° to 400°C, depending upon the particular glass composition. The glass in the holder is then transferred quickly to the tempering furnace operating at a temperature of 400°C to 500°C. The aluminum holder protects the glass from thermal shock during transfer from the preheat furnace to the tempering furnace. It remains in this furnace until its surface reaches a temperature that produces a viscosity of between $10^8$ to $10^9$ poise. The specific tempering temperature depends upon the particular composition temperature of the glass. The glass is then quickly transferred to an oil bath operating at a temperature of 150° to 190°C. The heat source for the oil bath is allowed to cool to room temperature in about 16 hours. The oil temperature determines the quenching rate. The glass is now tempered and the faces have to be polished after tempering, in accordance with standard polishing techniques in order to make the glass available for use as a window or lens element.

With the foregoing general description in mind and in an attempt to disclose the specific practice of this invention, the following detailed examples are presented. The examples illustrate specific processing parameters for two glasses of differeing compositional content. The particular glasses are representative of the non-oxide, ternary glass contemplated by the invention. In Example 1, the glass is composed of 28 atomic percent germanium, 60 atomic percent selenium and 12 atomic percent antimony. The glass of Example 2 is composed of 33 atomic percent germanium, 55 atomic percent selenium and 12 atomic percent arsenic. As was stated heretofore, other elements, such as iodine, gallium, mercury or tellurium may be used as the third component of the ternary glass.

EXAMPLE 1

Tempering Schedule

| | |
|---|---|
| Glass Sample | $Ge_{28}Se_{60}Sb_{12}$ |
| Preheat furnace temperature | 300°C |
| Temper furnace temperature | 400°C |
| Quench oil temperature | 175°C |
| Time in temper furnace | |
| 1 by 2.5 by ⅜-inch sample | 4 min |
| 2.5 by 5 by ⅜-inch sample | 6 min |
| 5 by 7 by ⅜-inch sample | 8 min |
| 5 by 10 by ⅜-inch sample | 5 min |
| Quench time | 10 min |
| Aluminum holder thickness | 0.5 inch |

EXAMPLE 2

Tempering Schedule

| | |
|---|---|
| Glass Sample | $Ge_{33}Se_{55}As_{12}$ |
| Preheat furnace temperature | 400°C |
| Temper furnace temperature | 500°C |
| Quench oil temperature | 190°C |
| Time in temper furnace | |
| 1 by 2.5 by ⅜-inch sample | 6.5 min. |
| 2.5 by 5 by ⅜-inch sample | 8.0 min. |
| 5 by 7 by ⅜-inch sample | 8.0 min. |
| Quench time | 10 min. |
| Aluminum Holder thickness | 0.5 inches |

The glass samples in the above examples were prepared and cast in accordance with known techniques, such as that disclosed in Texas Instruments Incorporated Technical Report No. AFAL-TR-68-348 dated January, 1969 and entitled "Research on Infrared Optical Material" by C. E. Jones and H. C. Hafner. Conventional furnaces were employed for preheating and tempering the samples of glass. The pre-heat furnace was a front-loading, air-circulating-type furnace that had a work space, 24 inches long by 24 inches wide by 30 inches deep. It had a cam-type program temperature controller with a top temperature limit of 450°C.

The tempering furnace was a top-loading, air-circulating type furnace with a work space of 38 inches long by 27 inches wide by 25 inches deep. It had a stepless-type temperature controller with a top temperature limit of 650°C. The top of this furnace was modified to minimize cool-down during loading. The quenching furnace was a vat-type furnace which had a 30 inch long by 12 inch wide by 18 inch deep work space. It had an off-on temperature controller and a top temperature limit of 540°C.

The sample sizes used for glasses in both Examples were 1 by 2.5 by ⅜ inch, 2.5 by 5 by ⅜ inch, and 5 by 7 by ⅜ inch. These were all prepared from castings that were about 5.1 by 7.1 by 0.5 inch. In addition, 5-by 10-by ⅜-inch samples of the Example 1 glass were made from castings that were about 5.1 by 10.5 by 0.5 inch in size.

All samples were ground and polished by conventional glass finishing procedures. The first Example 1 samples (1 by 2.5 by ⅜ inch) had all edges buffed and the corners were not beveled. The sharp corners caused premature breakag during flexure tests; therefore, all remaining samples had beveled corners. It was also found that samples could be prepared for tempering by grinding opposite faces flat and parallel to a fine-ground finish. The surfaces could then be polished to a shine for inspection prior to tempering. Edges were fine-ground and all corners were beveled to about 0.5 mm and fine-ground. After tempering, the surface could be polished to the desired finish for ultimate use as window and less elements.

Additional illustrations of the tempering process of this invention are shown in Table I as follows:

TABLE I

| | Glass composition of Ex. 1 | Glass Composition of Ex. 2 |
|---|---|---|
| Sample Size | 1 × 2.5 × ⅜ inch | 1 × 2.5 × ⅜ inch |
| Preheat temperature | 300°C to 320°C | 375°C |
| Temper Furnace Temperature | 350°C | 482°C |
| Quench oil temperature | 175°C | 195°C |
| Time in temper furnace | 4 min to 6 min | 4 min to 6 min |

Several samples of Example 1 glass were successfully tempered under these conditions. When tempering the 1-by 2.5-by 8 samples of Example 2 glass and the 2.5-by 5-by ⅜-inch samples of both the Example 1 and 2 glass, breakage occurred when transferring the glass from the preheat furnace to the tempering furnace.

An evaluation by calculation was made of thermal stress buildup in the surface of a ⅜-inch thick Example 1 glass sample when it is transferred from a furnace at 300°C through room air to the tempering furnace. A 5-second transfer time was assumed. A 20°C per second cooling rate would cause a 3000 psi surface stress during transfer and should cause breakage. The cooling rate at some points on the sample could possibly reach this level. Because of temperature gradients along the surface, danger of breakage during transfer increases as the sample size increases. It was found, therefore, that placing the glass in an aluminum holder or box reduced the thermal gradients along the surface. The holder eliminated breakage during transfer from the preheat furnace to the tempering furnace. This scheme also lowered both the heating and cooling rates slightly.

A satisfactory tempering cycle for the 1-by 2.5-by ½ inch sixe Example 1 glass sample in an aluminum holder was found to be as follows: The glass was preheated to 300°C, transferred to the quenching furnace at 175°C, held there for 10 minutes, removed, and placed in about 1 gallon of the 175° quench oil. The oil and holder assembly were then allowed to cool slowly to room temperature.

The determination of optimum tempering cycles of time and temperature were determined by using the aluminum sample holder, and it was feasible to measure the temperature of the glass surface during heatup at a reasonable tempering furnace temperature. This was done by placing a thermocouple in a notch in the glass surface inside the aluminum holder assembly. The thermocouple leads were brought outside the furnace for connection to a measuring device.

The glass strengthening, thermal tempering method as described herein provides infrared transmitting glass compositions that have an indicated strength improvement from 2500 psi to over 6000 psi.

Glass strength can be measured by a flexure test, a simple beam-loading method. A four-point loading arrangement is usually used for glasses. The load required for breakage is a measure of strength.

Several glass samples (1-by 2.5-by ⅜-inch) were tempered in accordance with the procedure shown in Example 1. They were flexure tested by the four-point beam-loading method. Results are shown in Table II. These samples broke about 2500 psi below their expected breaking stress. Their edges were not beveled and could have acted as stress concentrators and caused early failure.

TABLE II

Tempering of Samples from Example 2

| Sample No. | Preheat Temperature (°C) | Tempering Temperature (°C) | Tempering Time (min) | Quench Temperature (°C) | Breaking Stress (psi) | Remarks |
|---|---|---|---|---|---|---|
| 1 | 320 | 350 | 4.5 | 175 | 3900 | Slightly Warped |
| 2 | 300 | 350 | 4.5 | 175 | 4900 | |
| 3 | 300 | 350 | 4.5 | 175 | 4500 | |
| 4 | 300 | 350 | 4.5 | 175 | 6400 | |

Samples of glass from Example 2 were also flexure tested with the following results as shown in Table III.

TABLE III

Tempering of Samples from Example 2

A. 1 by 2.5 by ⅜-inch samples. Four samples tested failed at a breaking stress of 5450 psi, 4850 psi, 6180 psi, and 5890 psi respectively.
B. 1 by 2.5 by ⅜-inch sample. This sample withstood a load of 6250 psi without failure.
C. 2.5 by 5 by ⅜-inch samples. Two samples were tested and failed at a breaking stress of 6150 psi and 5380 psi respectively.

As can be seen from the above, the present invention provides a novel tempering method for reducing the effect of surface flaws and thus increase the strength of the non-oxide ternary glass compositions disclosed in this invention. Aircraft windows must withstand stresses induced by mechanical forces as well as those induced by thermal gradients. The glasses, heat treated in accordance with the novel tempering process of this invention, possess the necessary strength characteristics needed to withstand the strains encountered by aircraft operating within a high speed, high altitude environment.

While the invention has been described with particularity in reference to specific embodiments thereof, it is to be understood that the disclosure of the present invention is for the purpose of illustration only, and is not intended to limit the invention in any way, the scope of which is defined by the appended claims.

What is claimed is:

1. A method for the thermal tempering of a glass article having a non-oxide, ternary compositional content composed of germanium, selenium and a third element selected from the group consisting of antimony, arsenic, iodine, gallium, mercury and tellerium which comprises the steps of A. placing said glass article in a preheat furnace at room temperature, raising the temperature of said preheat furnace to a range of from about 40° to 50°C above the annealing temperature of said glass and maintaining said temperature for about 1 hour;

B. transferring said pre-heated glass to a tempering furnace operating at a tempering temperature of from about 400° to 500°C, retaining said glass in said tempering furnace until the surface thereof reaches a temperature that produces a viscosity of between about $10^8$ and $10^9$ poise; and C. transferring said tempered glass to an oil bath operating at a quenching temperature sufficiently elevated to allow for the quenching of said tempered glass article and cooling said oil bath to room temperature.

2. A method in accordance with claim 1 wherein said glass article is placed in a preheat furnace and raised to a temperature of about 300°C for about 1 hour; transferred to a tempering furnace operating at a temperature of about 400°C for about 4 to 10 minutes; and transferred to an oil bath operating at a temperature of about 175°C for about 10 minutes.

3. A method in accordance with claim 1 wherein said glass article is placed in a preheat furnace and raised to a temperature of about 400°C for about 1 hour; transferred to a tempering furnace operating at a temperature of about 500°C for about 6 to 8 minutes; and transferred to an oil bath operating at a temperature of about 190°C for about 10 minutes.

* * * * *